INVENTORS
PAUL R. VAN SITTERT
ROBERT L. FLEMING

INVENTORS
PAUL R. VAN SITTERT
ROBERT L. FLEMING

INVENTORS
PAUL R. VAN SITTERT
ROBERT L. FLEMING
BY
Woodling Krost Granger Rust
Attys.

United States Patent Office 3,232,173
Patented Feb. 1, 1966

3,232,173
AIR MOTOR
Paul R. Van Sittert, Cleveland, and Robert L. Fleming, Willowick, Ohio, assignors to The Cooper-Bessemer Corporation, a corporation of Ohio
Filed Feb. 27, 1964, Ser. No. 347,716
6 Claims. (Cl. 91—121)

The present invention relates in general to air motors and more particularly to the design of such motors whereby the objectionable noise level of the same is reduced.

The present invention has in view the purpose of greatly reducing the objectionably high noise level of air motors such as those used in driving rotary drills, grinders and similar devices. The inventive concept of the present disclosure makes use of the knowledge that the noise intensity of air flow through an orifice varies as the fifth power of the velocity. As a result, if the velocity of air leaving the exhaust port of the air motor is maintained substantially constant throughout all angular positions of the motor during the exhaust cycle, then the noise level may be substantially reduced. The exhaust volume of the air motor undergoes a rate of change (which can be shown graphically) and since it be desired that the exhaust velocity be substantially constant throughout, then to accomplish the desired result, the exhaust area of he exhaust port must change in proper relationship to the rate of change of exhaust volume. The absolute values of exhaust port size of course must be matched with the absolute values of the volume and change thereof during the exhaust cycle.

It is, therefore, an object of the present invention to design the shape or contour of the exhaust port of the air motor so that the cross sectional area thereof is substantially proportioned to the rate of change of volume of the exhaust chamber for all positions in the exhaust cycle.

Another object of the present invention is to provide a means of maintaining a substantially constant pressure on the exhaust chamber side of the exhaust port and a substantially constant pressure on the atmosphere side of the exhaust port during the exhaust cycle so that the velociy through the exhaust port is substantially constant.

Another object of the present invention relates to the finished article in which is produced the exhaust port of the present invention, and also relates to the method of producing the port.

Other objects and a fuller understanding of the invention may be had by referring to the following description and claims, taken in conjunction with the accompanying drawings, in which:

Figure 3:
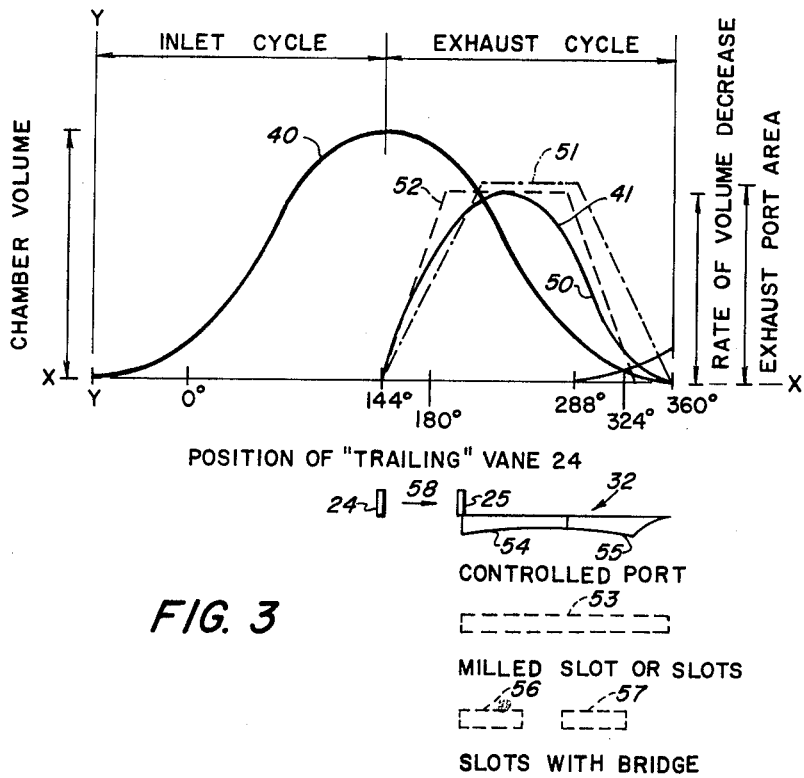
FIGURE 3 is a graph comparing the volume contained between two vanes of the air motor during 360 degrees rotation and the rate of change of this volume during the exhaust cycle as well as the curves for exhaust port area uncovered by two vanes for three differently shaped exhaust ports.
Figure 5:
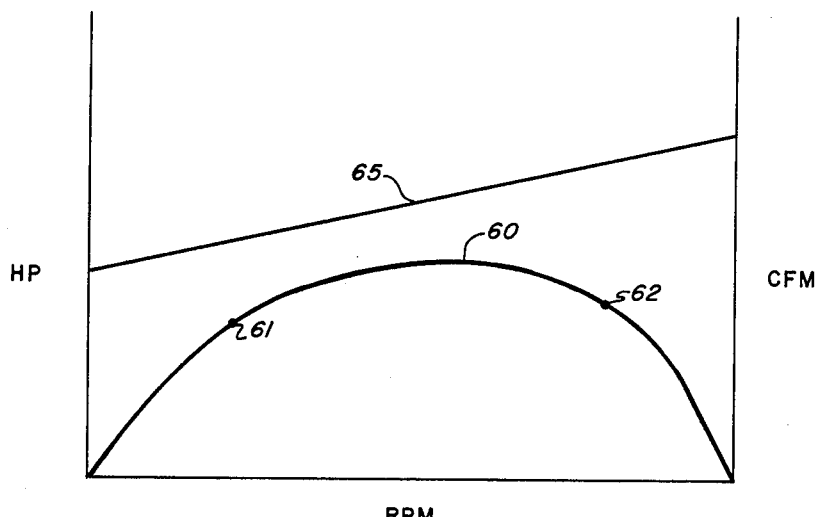
Figure 4:
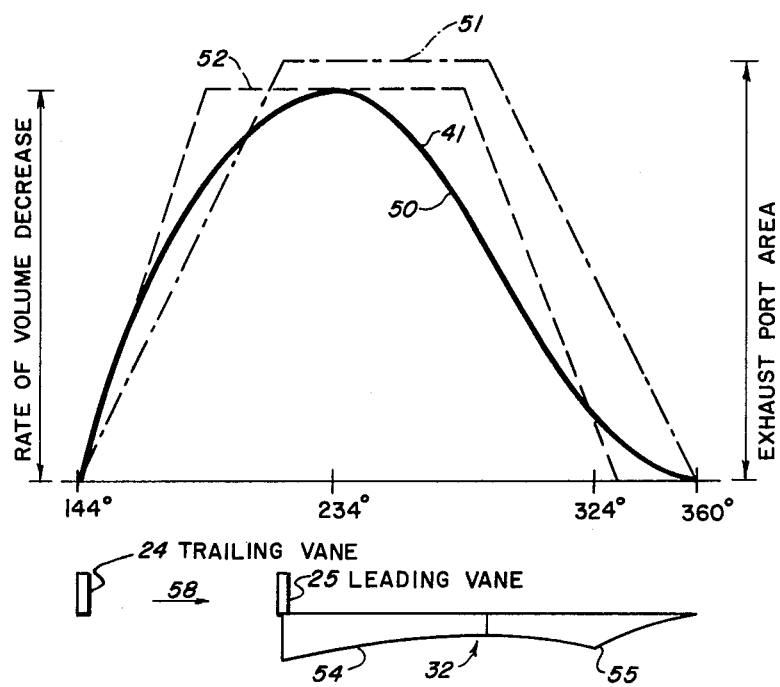
Figure 4:
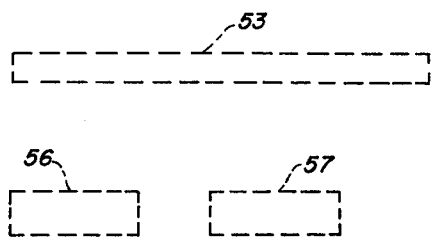

FIGURE 4 is an enlarged view similar to FIGURE 3 with the exception that the graph showing volume contained between two vanes has been omitted. In this view as in FIGURE 3 there is indicated directly below the graphs the shape of three different exhaust ports and the relative position of two vanes; and, FIGURE 5 is a graph illustrating generally the relationships between H.P., air consumption, and speed in the operation of an air motor.

Figure 1:
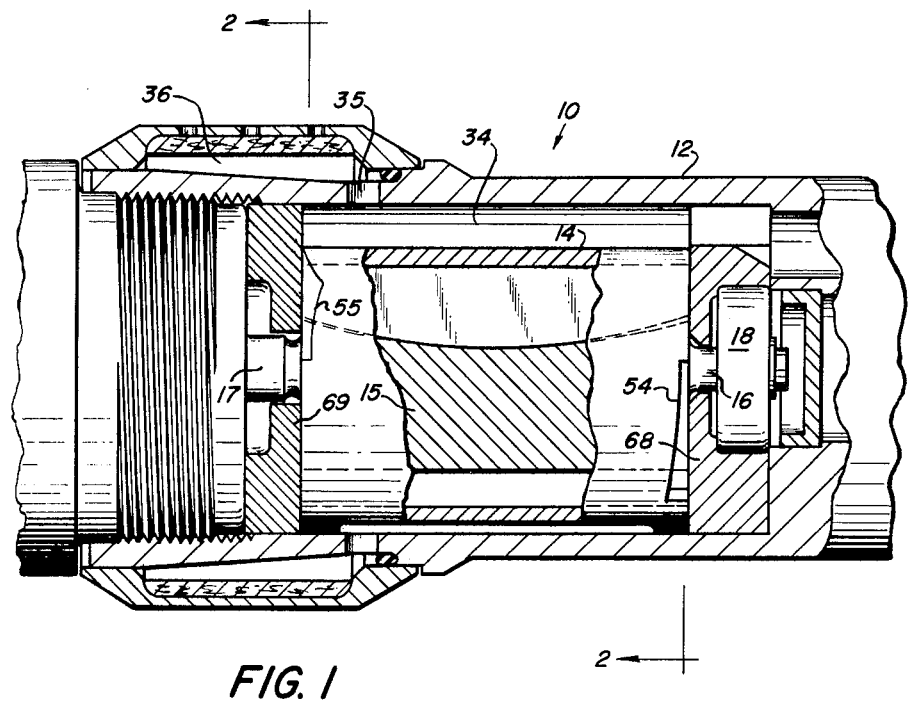
FIGURE 1 is a side elevational view of an air motor which embodies the teachings of the present invention.
Figure 2:
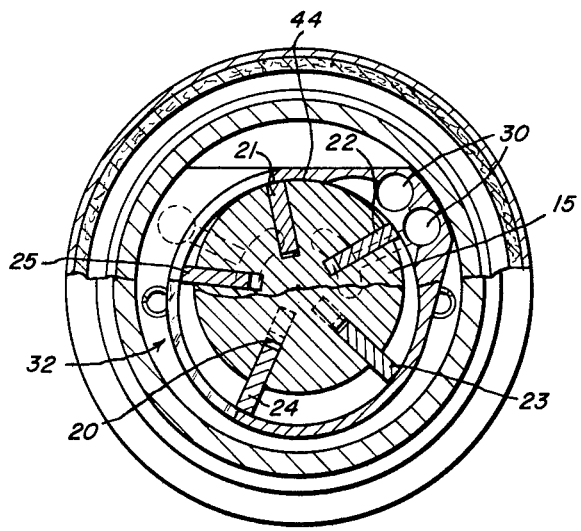
FIGURE 2 is a cross-sectional view taken generally along the lines 2—2 of FIGURE 1.

FIGURES 1 and 2 illustrate an air motor 10 constructed under the teachings of the present invention. This air motor includes in combination a main housing 12 within which is fixedly mounted a cylindrical sleeve 14. A rotor 15 is eccentrically mounted within the sleeve 14 for rotation and is supported by axial extensions 16 and 17 carried by bearings 18, with only the bearings on the right as seen in FIGURE 1 being shown. The extension 17 is in turn adapted to drive a spindle in a conventional manner which may be connected to a tool or the like. The rotor 15 is provided with a plurality of generally axially extending slots 20 (in this embodiment specifically five in number) which carry vanes 21–25 and the spaces between adjacent vanes define chambers which alternately go through intake and exhaust cycles upon rotation of the rotor 15.

Inlet port means 30 are provided (see FIGURE 2) and serve to introduce air under pressure to the various chambers between the vanes and specifically in FIGURE 2 to the chambers between vanes 21 and 22 as well as 22 and 23. Exhaust port means provide for the exit of air on the exhaust cycle of each chamber and is identified generally by the reference number 32. The exhaust port means construction and configuration will be discussed more thoroughly hereinafter but it will be specifically noted that the openings are located at the extreme axial ends of the sleeve 14 which enables one with conventional manufacturing methods to produce the unusual configuration of the exhaust port of the present invention. Air which exits through the exhaust port means passes into an exhaust space 34 formed between the sleeve 14 and the housing 12 and from there through openings 35 and thereafter to a manifold 36 and thence to atmosphere. These passages from the space 34 may be referred to as vent means.

FIGURE 3 includes a curve 40 which shows the volume of a specific chamber while it revolves through a complete inlet and exhaust cycle. In this graph the zero point on the X-axis is identified as the point 44 at which the cylinder bore and the rotor periphery are substantially tangent to each other. Note that the chamber volume has started to increase before the trailing vane 24 (when referring to vane 25 as the leading vane) has reached this zero position. This is because the leading vane 25 is ahead of tangency by reason of the angle between the leading and trailing vanes (in the illustrated five-vane rotor this angle is 72 degrees).

Increase in chamber volume continues throughout the inlet cycle until the midpoint of the chamber reaches the line of symmetry opposite tangency. Here the trailing vane is half the 72 degree angle from the 180 degree position or 144 degrees from tangency. The drawing of FIGURE 2 closely approximates these numerical values, however, this figure should not be scaled in an attempt to measure these exact numbers.

Decrease in chamber volume continues throughout the exhaust cycle so that the graph is symmetrical in respect to these cycles. When the leading vane reaches tangency (with the trailing vane 24 at 288 degrees in the five-vane illustration) it begins a new inlet cycle, but the specific chamber volume with which we are concerned continues to decrease and reaches zero when the trailing vane reaches 360 degrees.

Superimposed on FIGURE 3 is a reduced-scale version of FIGURE 4 for the purpose of indicating the functional and angular relationship to the graph of FIGURE 3.

Curve 41 of FIGURE 3 and FIGURE 4 shows the rate of decrease of volume of a particular chamber with respect to the same position of the trailing vane 24 as was used for curve 40. The slope or inclination of curve 40 is a measure of this rate of decrease. The rate of change starts at zero at the beginning of the exhaust cycle, passes through a maximum point near the middle of the exhaust cycle, and diminishes to zero again when the trailing vane reaches the 360 degree position.

The discovery of the present invention has to do with devising a correctly sized shape of exhaust port which will match the rate of change graph 41. Several such ports have been illustrated in FIGURES 3 and 4 and the degree of conformity shown in these figures. These ports are shown immediately below the curves 40 and 41 with port 53 and port 56–57 demonstrating prior art designs and with port 54–55 illustrating a port designed under the teachings of the present invention. The exhaust port opening connecting the chamber between vanes to the exhaust space 34 in the housing is measured by the area swept over in ports 53, 54–55 and 56–57 between vanes 25 and 24 when moved in the direction of arrow 58. The curve of port area 50 shown in FIGURES 3 and 4 indicates the effect of such movement over ports 54–55 of the present invention. Curve 50 of port area is practically congruent to curve 41 of rate of volume decrease. Conventional slot 53 which produces curve 51 shows serious deviation from curve 41. Slotted port construction 56–57 is often used because it provides a "bridge" between the two slotted portions which better resists the clamping pressures on the axial ends of sleeve 14 required to seal the motor axially. This construction produces curve 52. The angular distance from the start of slot 56 to that of slot 57 should be made equal to the angular distance from vane 25 to vane 24 to avoid a "dip" in the top of curve 52.

The lack of conformity of curves 51 and 52 of FIGURES 3 and 4 to curve 41 will create fluctuations in the velocity of the exhaust stream passing through the exhaust port. These fluctuations cause a pulsation of the air at discrete frequencies measured by the number of vanes passing the port per unit time and in various multiples or harmonics of these frequencies. Also the violence of fluctuation in velocity above and below a mean value requires that when the velocity is at a peak value, the rushing noise it creates is many times more intense than if the velocity could be kept at its mean value.

The exact size of exhaust ports 53, 54–55, and 56–57 should be designed so that the intended exhaust pressure inside of the motor will just force all of the exhaust air through these ports against the intended back-pressure in the housing. Since two or more chambers may be discharging exhaust air through different portions of the same opening simultaneously, the total port area of the opening is the quantity to match against the total air usage of the motor. It is assumed that the intended exhaust pressure inside and outside of these exhaust ports will be selected as the smallest pressures consistent with the required power output of the motor. If this assumption is true, then the size of the exhaust ports specified will yield the minimum mean exhaust velocity through the ports.

At any particular motor speed there is an exhaust flow rate for each position of the rotor which will just balance the rate of decrease in the volume between vanes so as to hold the pressure of this volume between vanes constant. The flow rate depends on both the pressure difference and the port size. Hence, to maintain constant pressures, the port size must vary as the time-rate of decrease in volume.

It is also known that the velocity of flow of air through an opening is dependent on the pressure differential across the opening and not on the size of the opening. It will be see from reviewing the rate of change curve 41 that different values occur at different angular positions in the exhaust cycle. In view of this it has been discovered that the total exhaust port area uncovered between the vanes which form a chamber must also vary according to the rate of change of volume so as to provide a substantially constant velocity from the exhaust port at all angular positions of the exhaust cycle.

In order to accomplish the above referred to results it is necessary that the curve resulting from plotting angular position on the X-axis against total port area uncovered on the Y-axis, match or in other words assume substantially the same general shape as the rate of change curve 41 in FIGURES 3 and 4. FIGURES 3 and 4 show the curve 41 of FIGURE 3 and the curve 50 which is the showing of total port area uncovered by vanes 25 and 24 in sweeping over port 54–55. This curve 50 can be derived mathematically or can be derived graphically. FIGURE 4 shows the contour of the exhaust port 32 and this port is divided into the first and second portions 54 and 55, respectively. The two vanes 24 and 25 are illustrated therein and are adapted to travel in the direction of arrow 58. As the vanes travel in the direction of arrow 58, the total port area uncovered at a given angular position is shown in curve 50. The units for curves 41 and 50 are obviously different, the one curve being for volume and the other being for area. However, they vary proportionately and as a result accomplish the purpose of maintaining a substantially constant pressure in the exhaust space with a substantially constant exhaust velocity and a consequent reduction in noise level.

The absolute values for the curve 50 (for example, square inches) will depend on the absolute values for the rate of change of volume curve 41 (for example, cubic inches). Those skilled in the art can calculate the optimum port size for a given volume-pressure-flow-velocity condition.

It will also be appreciated by those skilled in the art that an air motor in accomplishing its function of doing work will operate over a range of conditions. FIGURE 5 illustrates a curve 60 of horsepower (H.P.) versus revolutions per minute (r.p.m.) and on such a curve the motor will be operating in most instances, for example, between points 61 and 62. Curve 65 in FIGURE 5 is a general curve showing air consumption, for example, in cubic feet per minute (c.f.m.) versus r.p.m. It will be seen from the H.P. curve 60 that the portion between points 61 and 62 is nearly flat as well as the air consumption curve 65 between these two points, and as a result in picking absolute values for the port area curve 50, one will be substantially correct for most operating conditions of the air motor if he designs his motor ports for the middle of this range.

The air motor 10 which has been shown is of the non-reversible type. In a reversible type motor it will be apparent to those skilled in the art that it would be necessary to modify the teachings of the present invention to provide for conditions when the motor was reversed.

The present invention also has to do with the novel positioning of the unique exhaust port and the means of providing the same. As will be noted the first portion 54 of the exhaust port means 32 is provided in one extreme axial end of the sleeve 14 (on the right as seen in FIGURE 1) and the second portion is provided in the other extreme axial end of the sleeve 14 (on the left as seen in FIGURE 1). The ends of the sleeve 14 are closed by the abutting of the same with end members 68 and 69, respectively. The portions 54 and 55 of the exhaust port may be said to be in the joint between the ends of the sleeve 14 and the end members 68 and 69. It will be understood that to produce the contour of exhaust opening shown in FIGURES 1, 3 and 4 at any place between the extreme axial ends of the sleeve would be extremely difficult, if not economically impossible. The present invention as noted above provides for the intricate contour to be produced in the extreme axial ends of the sleeve which enables the device to be produced economically by conventional machining operations such as milling or grinding.

The entire contour of the exhaust port may be provided in one end of the sleeve 14 rather than a portion at each end, however in the present embodiment it is desirable to produce the exhaust port as shown because if all of it is provided at one end there is not sufficient circumferential engagement with an end member (68 or 69) to provide proper support for the sleeve 14.

The operation of the air motor 10 is generally conventional with air under pressure being introduced through the inlet port means 30 which cause rotation of the rotor 15 in a clockwise direction as seen in FIGURE 2. During the first part of the exhaust cycle, air passes from sleeve 14 through portion 54 and in the latter part of the exhaust cycle, through portion 55 into the exhaust space 34 and to atmosphere through opening 35 and manifold 36. A hand actuated valve (not shown) conventionally controls the passage of air to the inlet port means 30.

As a result of the shaping or contouring of the exhaust port means 32 as herein described, the velocity of the air therethrough is maintained substantially constant with resultant lowering of the noise level of the air motor. The other aforementioned objects are also carried because of these teachings with the resultant contributions to the art.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In an air motor including a rotor carrying vanes and wall means eccentrically disposed relative to said rotor defining a chamber between said rotor, said mall means and said vanes, which chamber is adapted to rotate on an intake and an exhaust cycle, that improvement which comprises an exhaust port leading from said chamber on said exhaust cycle, said exhaust port being so designed that the cross-sectional area of said port is substantially proportional to the rate of change of volume of said chamber for all positions in said exhaust cycle.

2. In an air motor a rotor carrying vanes, wall means eccentrically disposed relative to said rotor and defining a chamber between said rotor, said wall means and said vanes, which chamber varies in volume during an intake and an exhaust cycle, that improvement which comprises an exhaust port having a cross-sectional area proportioned so as to yield a substantially constant pressure through said exhaust cycle.

3. In an air motor containing a rotor carrying vanes and wall means eccentrically disposed relative to said rotor to define chambers between said rotor, said wall means and said vanes, a housing surrounding said wall means with an exhaust space between said housing and said wall means, vent means leading from said exhaust space, port means leading from said chambers to said exhaust space, said port means being characterized by a shape yielding a substantially constant pressure in said chambers and said exhaust space whereby the exhaust velocity from said chambers to said exhaust space remains substantially constant.

4. In an air motor containing a rotor carrying vanes and wall means eccentrically disposed relative to said rotor and end closure members abutting said wall means to define chambers between said rotor, said wall means and said vanes, inlet ports to said chambers and exhaust ports from said chambers, said exhaust ports being located at the joint between said end members and said wall means and of a shape and size to produce uniform exhaust velocity for at least one operating condition of said air motor.

5. In an air motor including a right cylindrical sleeve having a rotor mounted eccentrically therein and carrying angularly spaced vanes engaging the sleeve to form alternately expanding intake and contracting exhaust chambers on rotation of the rotor; and first and second end members closing the ends of the sleeve; and inlet means for feeding air under pressure into the expanding intake chambers; the improvement comprising exhaust means for exiting air from said contracting exhaust chambers, said exhaust means being designed whereby the exhaust means cross sectional area uncovered by the contracting exhaust chambers is substantially proportional to the rate of change of volume of the contracting exhaust chambers, said exhaust means having first and second portions, said first portion comprising wall means on a first axial end of said sleeve in combination with the first end member defining an opening, said second portion comprising wall means on a second axial end of said sleeve in combination with the second end member defining another opening.

6. In an air motor including a sleeve having a rotor mounted eccentrically therein and carrying angularly spaced vanes engaging the sleeve to form alternately expanding intake and contracting exhaust chambers; and first and second end members closing the ends of the sleeve; and inlet means for feeding air under pressure to the expanding intake chambers; the improvement comprising exhaust means for exiting air from said contracting exhaust chambers, said exhaust means being designed whereby the exhaust means cross sectional area uncovered by the contracting exhaust chambers is substantially proportional to the rate of change of volume of the contracting exhaust chambers, said exhaust means having first and second portions, said first portion comprising wall means on an axial end of said sleeve and said second portion comprising wall means on an axial end of said sleeve.

References Cited by the Examiner

UNITED STATES PATENTS

| 695,896 | 3/1902 | Troxler | 91—121 |
| 935,343 | 9/1909 | Westinghouse | 91—121 X |
| 2,643,731 | 6/1953 | Schmid | 91—121 X |
| 2,882,831 | 4/1959 | Dannevig | 103—136 X |
| 3,097,571 | 7/1963 | Kaman | 91—121 X |

SAMUEL LEVINE, *Primary Examiner.*